(12) United States Patent
Hammond et al.

(10) Patent No.: US 7,752,248 B2
(45) Date of Patent: Jul. 6, 2010

(54) SYSTEM AND METHOD FOR VIDEO PROCESSING

(75) Inventors: Keith Steward Hammond, Chelmsford (GB); Martin Weston, Petersfield (GB)

(73) Assignee: Snell Limited, Hampshire (GB)

( * ) Notice: Subject to any disclaimer, the term of this patent is extended or adjusted under 35 U.S.C. 154(b) by 1304 days.

(21) Appl. No.: 11/222,235

(22) Filed: Sep. 9, 2005

(65) Prior Publication Data

US 2006/0059218 A1    Mar. 16, 2006

(30) Foreign Application Priority Data

Sep. 9, 2004  (GB)  ............................. 0420042.4

(51) Int. Cl.
  *G06F 17/17* (2006.01)
(52) U.S. Cl. ....................................... 708/313
(58) Field of Classification Search ................. 708/313, 708/319
  See application file for complete search history.

(56) References Cited

U.S. PATENT DOCUMENTS 5,574,572 A * 11/1996 Malinowski et al. ........ 358/451
5,835,160 A    11/1998 Chen et al.
6,141,671 A * 10/2000 Adams et al. ................ 708/313
6,339,434 B1 * 1/2002 West et al. ................... 345/667
6,354,315 B1    3/2002 Liu

FOREIGN PATENT DOCUMENTS

EP    0475788    3/1992

OTHER PUBLICATIONS

Search Report for GB Patent Application 0420042 4 Date of Search: Jan. 31, 2005.

* cited by examiner

*Primary Examiner*—Chuong D Ngo
(74) *Attorney, Agent, or Firm*—Pearl Cohen Zedek Latzer, LLP

(57) ABSTRACT

Method and apparatus for decimating or sub-sampling image data which uses fixed delay intervals to accumulate a weighted sum of input samples. The accumulated sum is output at selected intervals, the interval determining the degree of decimation. The apparatus can take the form of a Finite Impulse Response (FIR) decimation filter. Decimation can be horizontal, vertical or temporal, and the decimation factor can be made non-integral.

5 Claims, 5 Drawing Sheets

| Delay Input | Delay-line contents 1 | Delay-line contents 2 | Delay Output | Decimated Output |
|---|---|---|---|---|
| S12+S9+S6 | S11 | S10+S7+S4+S1 | S9+S6 | |
| S13+S10+S7+S4+S1 | S12+S9+S6 | S11 | S10+S7+S4+S1 | |
| S14+S11 | S13+S10+S7+S4+S1 | S12+S9+S6 | S11 | |
| S15+S12+S9+S6 | S14+S11 | S13+S10+S7+S4+S1 | S12+S9+S6 | |
| S16 | S15+S12+S9+S6 | S14+S11 | S13+S10+S7+S4+S1 | S13+S10+S7+S4+S1 |
| S17+S14+S11 | S16 | S15+S12+S9+S6 | S14+S11 | |
| S18+S15+S12+S9+S6 | S17+S14+S11 | S16 | S15+S12+S9+S6 | |
| S19+S16 | S18+S15+S12+S9+S6 | S17+S14+S11 | S16 | |
| S20+S17+S14+S11 | S19+S16 | S18+S15+S12+S9+S6 | S17+S14+S11 | |
| S21 | S20+S17+S14+S11 | S19+S16 | S18+S15+S12+S9+S6 | S18+S15+S12+S9+S6 |
| S22+S19+S16 | S21 | S20+S17+S14+S11 | S19+S16 | |
| S23+S20+S17+S14+S11 | S22+S19+S16 | S21 | S20+S17+S14+S11 | |
| S24+S21 | S23+S20+S17+S14+S11 | S22+S19+S16 | S21 | |
| S25+S22+S19+S16 | S24+S21 | S23+S20+S17+S14+S11 | S22+S19+S16 | |
| S26 | S25+S22+S19+S16 | S24+S21 | S23+S20+S17+S14+S11 | S23+S20+S17+S14+S11 |
| S27+S24+S21 | S26 | S25+S22+S19+S16 | S24+S21 | |
| S28+S25+S22+S19+S16 | S27+S24+S21 | S26 | S25+S22+S19+S16 | |
| S29+S26 | S28+S25+S22+S19+S16 | S27+S24+S21 | S26 | |
| S30+S27+S24+S21 | S29+S26 | S28+S25+S22+S19+S16 | S27+S24+S21 | |
| S31 | S30+S27+S24+S21 | S29+S26 | S28+S25+S22+S19+S16 | S28+S25+S22+S19+S16 |
| S32+S29+S26 | S31 | S30+S27+S24+S21 | S29+S26 | |
| S33+S30+S27+S24+S21 | S32+S29+S26 | S31 | S30+S27+S24+S21 | |
| S34+S31 | S33+S30+S27+S24+S21 | S32+S29+S26 | S31 | |
| S35+S32+S29+S26 | S34+S31 | S33+S30+S27+S24+S21 | S32+S29+S26 | |
| S36 | S35+S32+S29+S26 | S34+S31 | S33+S30+S27+S24+S21 | S33+S30+S27+S24+S21 |

Figure 3a

| Delay Input | Delay-line contents 1 | 2 | 3 | 4 | Delay Output | Decimated Output |
|---|---|---|---|---|---|---|
| S14+S9+S4 | S13 | S12+S7 | S11+S6+S1 | S10 | S9+S4 | |
| S15+S10 | S14+S9+S4 | S13 | S12+S7 | S11+S6+S1 | S10 | |
| S16 | S15+S10 | S14+S9+S4 | S13 | S12+S7 | S11+S6+S1 | S11+S6+S1 |
| S17+S12+S7 | S16 | S15+S10 | S14+S9+S4 | S13 | S12+S7 | |
| S18+S13 | S17+S12+S7 | S16 | S15+S10 | S14+S9+S4 | S13 | |
| S19 | S18+S13 | S17+S12+S7 | S16 | S15+S10 | S14+S9+S4 | S14+S9+S4 |
| S20+S15+S10 | S19 | S18+S13 | S17+S12+S7 | S16 | S15+S10 | |
| S21+S16 | S20+S15+S10 | S19 | S18+S13 | S17+S12+S7 | S16 | |
| S22 | S21+S16 | S20+S15+S10 | S19 | S18+S13 | S17+S12+S7 | S17+S12+S7 |

Figure 3b

SYSTEM AND METHOD FOR VIDEO PROCESSING

PRIOR APPLICATION DATA

This present application claims priority from United Kingdom Patent Application 04200424, entitled "Video Processing", filed on Sep. 9, 2004, disclosure of which is incorporated herein by reference in its entirety.

FIELD OF INVENTION

This invention concerns decimation or sub-sampling of image data.

BACKGROUND OF THE INVENTION

It is often necessary to take a regular set of samples representing a scanned image and convert them to a smaller number of samples which represent the same image. A typical example is the conversion of a high-definition TV picture into an equivalent standard-definition picture. The process is usually carried out separately in the horizontal and vertical dimensions; the horizontal process reducing the number of samples per line, and the vertical process reducing the number of scan lines. Temporal sub-sampling is also possible to reduce the rate at which successive pictures are output.

Where the samples are represented as a sequence of values in a digital system, it is well known to use a finite impulse response (FIR) digital filter of the form shown in FIG. 1 to decimate the samples. Referring to FIG. 1 (in which the parameter D represents the required decimation factor), a sequential stream of samples (1) is input to a set of cascaded delay elements (2). Each of the individual delay elements has a delay equal to the product of the required decimation factor and the input sample period. (Typically these delays take the form of a set of registers controlled by a common clock signal which causes the sample values to propagate along the "pipeline" of registers.) Samples equally spaced along the set of delays are input to a set of multipliers (3) which multiply each sample by a coefficient value sent to the respective multiplier from a control system (4), and the outputs of the multipliers are summed (5). Once per input sample the sum is added to the contents of an accumulator (6). After a number of accumulations equal to the decimation factor, the accumulated value is output as a decimated sample (7), the accumulator set to zero and the process repeats to produce the next decimated sample.

The set of multiplier coefficients which are used to construct a particular decimated output sample are known as the filter "aperture" and there are well-known methods for deriving them. For large decimation factors, it is usually advantageous to have a "wide" filter aperture including weights for a large number of input samples; for a given decimation factor increasing the width of the aperture requires an increase in the number of multipliers and delay elements.

In this prior-art system it is difficult to vary the decimation factor. A first problem arises since the delays between the multiplier inputs have to be changed to match the factor. Also, for very large decimation factors, correspondingly long delays are required. This is particularly difficult when decimating vertically, as vertically-adjacent samples are separated by the number of samples per line and the delays have to be increased by this factor.

SUMMARY OF THE INVENTION

Accordingly, in a first aspect, the invention provides a method for decimating image data comprising the steps of receiving a series of image samples at fixed delay intervals; accumulating a weighted sum of received input samples; and outputting an accumulated sum at selected intervals, whereby the selected interval controls the degree of decimation of the image data.

In this way the decimation factor can be varied easily and simply. It is also advantageous in that an increased aperture size can be achieved using delays of a given length.

Preferably the method further comprises accumulating a second weighted sum of received input samples, said second weighted sum including samples accumulated in said first weighted sum, and preferably a new accumulation is commenced each time an accumulated sum is output.

Advantageously the intervals can be selected such that the decimation factor is non-integral.

According to a second aspect of the invention there is provided an apparatus for decimating image data comprising an input for receiving a series of image samples; an accumulator for accumulating a weighted sum of input samples received at fixed delay intervals; and an output for outputting from the accumulator an accumulated sum at selected points in time, wherein the selection of output times controls the degree of decimation of the image data.

Suitably the accumulator can simultaneously accumulate more than one weighted sum of input samples.

According to a third aspect of the invention there is provided a finite impulse response (FIR) decimation filter for sub-sampling an image, said filter having fixed delays between the filter taps, wherein the decimation factor is varied by changing the number of contributions to a value output from the filter.

BRIEF DESCRIPTION OF THE DRAWINGS

An example of the invention will now be described with reference to the drawings in which:

FIGS. 3a and 3b show examples of the operation of the decimator of FIG. 2.

DETAILED DESCRIPTION

Figure 1:
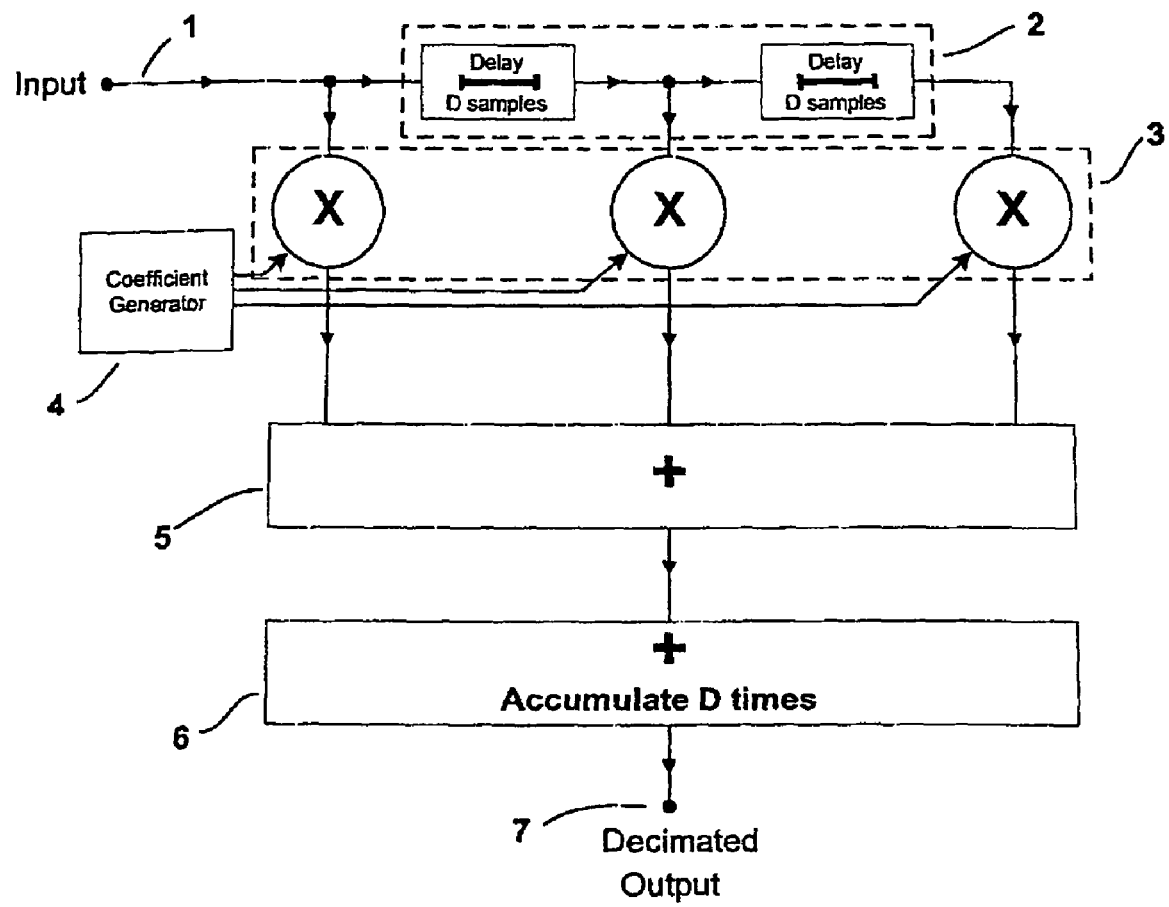
FIG. 1 shows a prior-art decimator.
Figure 2:
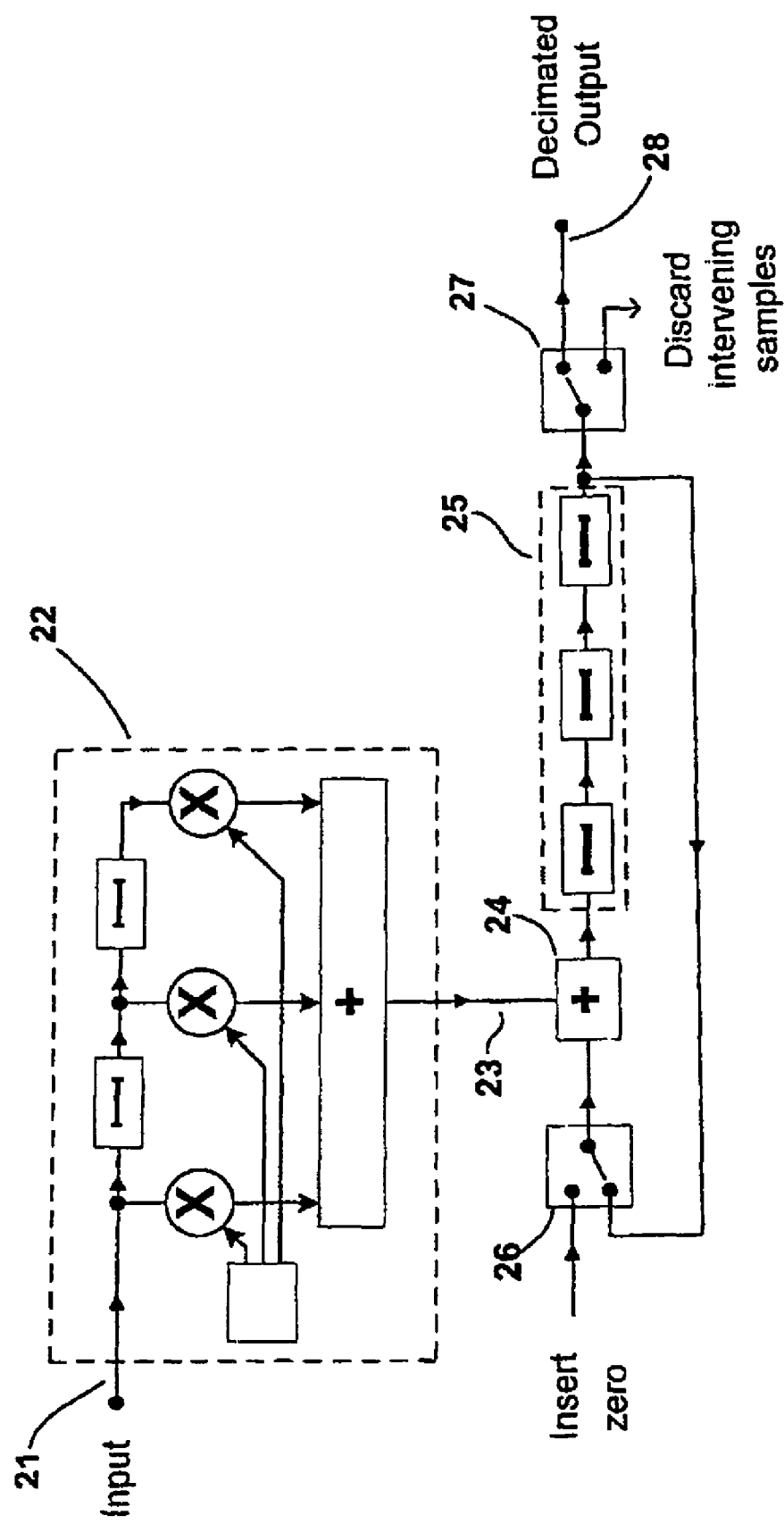
FIG. 2 shows a decimator according to an embodiment of the invention.

Referring to FIG. 2, a stream of input samples (21) is input to a known FIR filter (22). This may be similar to that shown in FIG. 1 (in which the inputs to the multipliers are not taken from adjacent samples) or it may be as shown at (22) in which the multiplier inputs are separated by unit-sample-period delays. However, there is no accumulation of successive multiplier outputs within the block (22); output samples (23) are formed at the input sample rate by adding together all the multiplier outputs.

The filter output (23) is fed via adder (24) to an N-sample-period delay (25). The number of sample periods N is chosen to be equal to the length of the aperture of the filter (22); in FIG. 2 the filter (22) has three multipliers one sample apart, and so N is three. The second input of the adder (24) is taken from a changeover switch (26), which selects either the output of the delay (25) or a zero value. When a decimated output sample is required, an output from the adder (24) is taken by another switch (27) and output at the terminal (28) In FIG. 2 the output is shown taken from the end of the delay (25) but it could be taken from any convenient point along the delay (25), including the input, depending on the required output timing. (The timing of the switch (27) would, of course, need to be changed if its input were taken from a different point on the delay-line.)

The decimation factor is controlled by the action of the switch (26). Normally it routes the output of the delay (25) to the adder (24), however, once a number of samples equal to the decimation factor have been processed, a zero value is selected so that the filter output (23) is input to the delay (25) without being changed by the adder (24). On the next sample the switch is returned to its original position, and the cycle repeats.

When the switch (26) is set to route the output of the delay (25) to the adder, filter outputs (23) which are N samples apart are accumulated and recirculated around the delay (25). Because the aperture of the filter (22) is N samples long, the values which are accumulated correspond to the application of the filter (22) to adjacent, non-overlapping blocks of input samples (21). The accumulated samples thus correspond to a notional filter having an effective aperture which is wider than that of the filter (22) by a factor equal to the number of accumulations by the adder (24)

As noted above, once an accumulated output sample (28) has been taken by the switch (27), a zero is selected by the switch (26) and this resets and re-starts the accumulation process for a subsequent output (23) from the filter (22). Subject to certain constraints (described below) it is possible for the system of FIG. 2 to provide decimation by a factor which depends only on the operation of the switch (26). For example, if the switch selects zero once in every five samples, the input (21) will be filtered by a filter having an effective aperture five times as long as the filter (21) and will be decimated by a factor of five at the output (28).

As mentioned previously, the accumulation of filter outputs (23) is terminated after creating a decimated output sample. For the system to work properly this termination must not happen until after the required number of accumulations have been made. This condition depends on the relationship between the decimation factor and the length of the delay (25). Provided these do not share any common factors the accumulation process will complete before it is reset.

FIG. (3) shows two examples of the operation of an exemplary system. FIG. 3a shows decimation by a factor of five where the filter (22) has an aperture three samples long; and FIG. 3b shows decimation by three with a five-tap filter. In FIG. 3, SN represents the Nth output value from filter (22). Highlighted boxes in the left hand column (the delay input) represent values input to the delay without any addition of a delay output.

If there is a common factor between the decimation factor and the filter length (which is equal to the number of samples stored in the delay) the regular resetting of the accumulation process once per output sample will occur before the required number of contributions to an output sample has been accumulated. This embodiment cannot therefore be used for arbitrary decimation factors. However, if a prime number is chosen for the filter length decimation by any number that is not a multiple of this length is possible. It is also possible for the average decimation factor to be non-integral by varying the duty cycle of the switches over time.

It is, of course, also necessary for the coefficients applied to the multipliers in the filter (22) to be appropriate for the larger filter notional filter which is synthesised by the accumulation of its outputs. The actual filter aperture is widened by the decimation factor and the notional filter aperture is made up of several versions of the actual aperture placed end-to-end. If the sequence of coefficients for the notional filter are divided into sub-sequences equal in length to the actual filter, these sub-sections can be loaded in turn into the multipliers so that the number of sub-sections is equal to the decimation factor and a new sub-section is loaded in sequence after a number of sample periods equal to the length of the filter (22).

Figure 4:
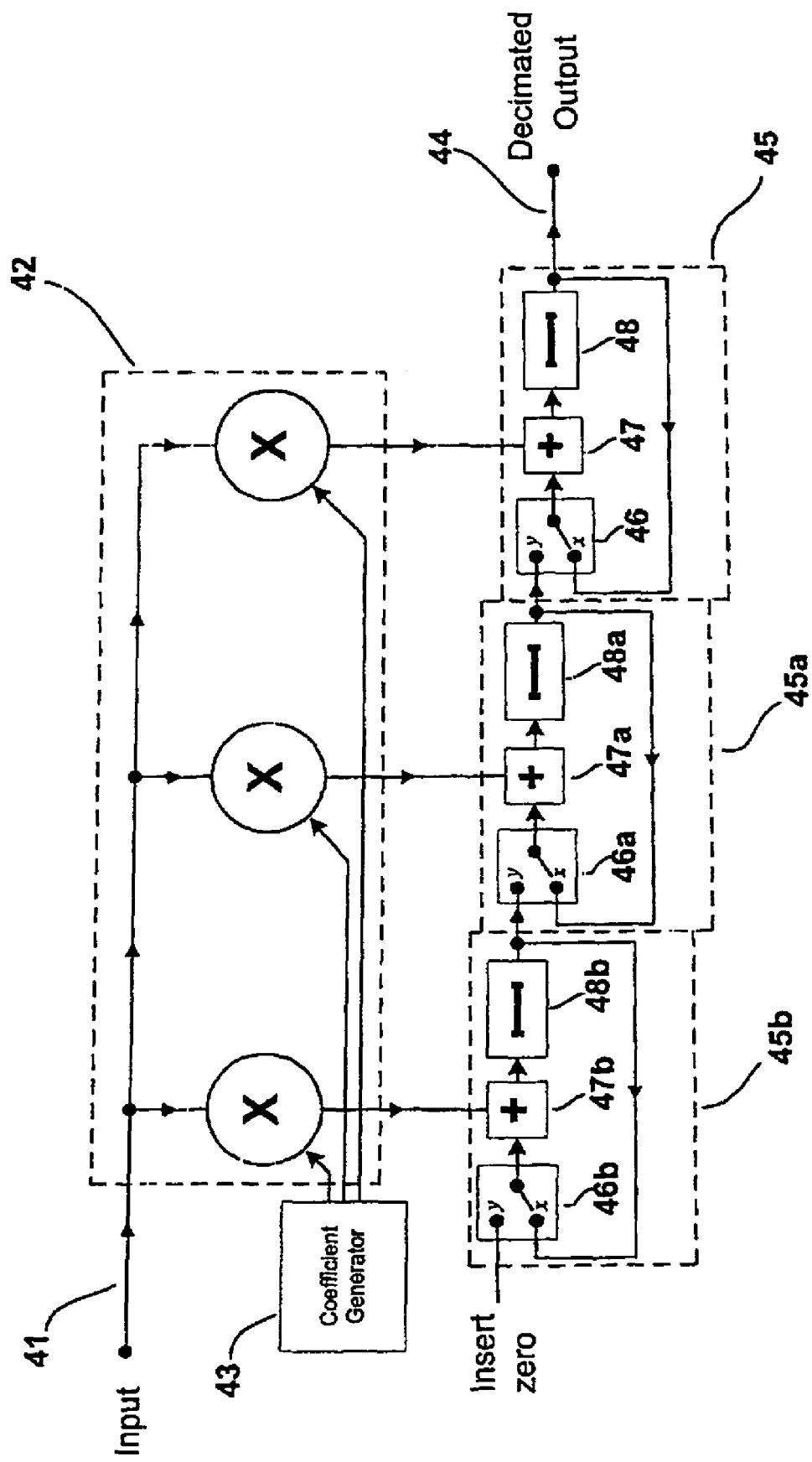
FIG. 4 shows a decimator according to an alternative embodiment of the invention.

Another embodiment of the invention will now be described with reference to FIG. 4. A stream of input samples (41) is fed in parallel to a set of multipliers (42). Each multiplier is fed a coefficient from a control system (43). A decimated output (44) is derived by an accumulation and delay block (45) comprising a changeover switch (46), an adder (47) and a delay element (48). There is a chain of identical accumulation and delay blocks (45) (45a) (45b), each corresponding to one of the set of multipliers (42). Each block works to construct a different output pixel, line or temporal sample, depending on the length of the delay elements (48). (in the following explanation horizontal decimation is described and so the delays are one sample-period long.)

Initially all the switches (46) are set (to the position marked x) so as to input the respective outputs from the delay elements (48) to one input of the corresponding adders (49). As each new input sample (41) arrives, a weighted contribution (the weight depending on the respective multiplier coefficient from the control system (43)) is input to the second input of the relevant adder (47), so that an accumulated value is input to the delay (48) One sample period later the accumulated value emerges from the delay (48) and has a weighted contribution from the next input sample (41) added to it; this process can be repeated a number of times Subsequently, the switches (46) are changed to position (y) so that the inputs to the adders (47) are fed from one block (45) to the left in the figure, and a decimated sample (44) is output.

The accumulation and delay blocks (45) now add weighted contributions from the next input sample (41) to the value passed from the previous block (45). Once this has been done the switches (46) are returned to position (x) and the process of accumulation is repeated one or more times before the switches (46) are set to position (y) for one sample period and another decimated sample is output (44).

It can be seen that the rate at which output samples (44) are produced is reduced from the rate of the input samples (41) by a factor equal to the "duty cycle" of the switches (46), ie. if the switches are set to position (y) for one out of every three input sample periods the input samples are decimated by a factor of three.

Each output sample (44) comprises a weighted sum of several input samples (41); the number of contributions being equal to the product of the number of multipliers (42) and the switch duty cycle (i.e. the decimation factor). In this way the effective decimation filter aperture is made greater than the number of multipliers (42). Also, it is possible to vary the decimation factor at will by changing the switch duty cycle. It is even possible to obtain decimation by a non-integer factor by using an irregular switch control pattern. There is complete freedom to define the weighting factors for each element of filter aperture; the control system (43) needs to compute the phase difference between the current input sample (41) and the next output sample (44). This phase value is used to determine the coefficient for the right-most multiplier (42); the phase values used to determine the coefficients for the multipliers to the left of this need to be offset by the phase equivalent of one output sample for each accumulation and delay block. The phase values can be quantised so as to reduce the number of coefficient values which have to be stored.

Filters designed in accordance with the invention are particularly advantageous in implementing a vertically decimating video filter.

With a conventional decimating vertical filter, the effective length (no. of taps x decimation factor) should be less than twice the number of lines in the vertical blanking interval to avoid video information from the bottom of one field being dragged into the top of the next and vice-versa. If a longer effective length of decimating filter is desirable, two complete filters are required, each handling alternate television fields.

The filter in accordance with the invention may be applied such that the first line of the television field generated by the filter has the centre of the filter aligned with the first input line, and the last line generated has the centre of the filter aligned with or below the last line of the input field. This can always be achieved, as a result of the variable decimation factor When the end of the input field is reached, the filter is switched to non-decimating mode, so all the partially accumulated results are output on adjacent lines. In this way the whole field can be filtered. This is always possible provided the number of taps is less than twice the number of lines in vertical blanking.

The present invention has been described with reference to exemplary embodiments and the skilled person will appreciate that the variations may be made within the scope of the appended claims.

The invention claimed is:

1. A finite impulse response (FIR) decimation filter for sub-sampling an input image to output a sub-sampled image, said filter comprising:
   a plurality of filter taps;
   a fixed number of coefficient multipliers connected respectively in parallel to said filter taps, each multiplier producing a respective weighted contribution from said input; and
   a fixed-length chain of serially-connected accumulators with the respective multiplier outputs connected to respective ones of said accumulators and where the accumulated values are passed along the chain at the decimated output sample rate,
   wherein the decimation factor can be varied by changing the number of times values are accumulated in said accumulators.

2. A filter according to claim 1 in which the decimation factor is not an integer.

3. A filter according to claim 1, where the decimation factor is changed by changing the number of times said weighted contributions from an input sample are accumulated in said serially connected, fixed length chain of accumulators.

4. A finite impulse response (FIR) decimation filter for sub-sampling an input image to output a sub-sampled image, said filter comprising:
   a plurality of filter taps having fixed delays between the filter taps, and a recirculating storage loop arranged in stages, in which a weighted sum of input samples being a sum of weighted input samples is accumulated in said recirculating storage loop so that data is transferred from each respective stage to the next at the input sample rate and decimated samples are taken from one of the stages at output sample rate,
   wherein the time for data to complete one circuit of the loop is less than a number of input sample periods equal to the decimation ratio, and
   wherein the decimation factor can be varied by changing the number of times values are accumulated in said accumulators.

5. A filter according to claim 4 in which the decimation factor is not an integer.

* * * * *